June 13, 1967 F. H. SAWADA 3,325,656
HIGH SPEED DISCRIMINATOR WITH A WIDE DYNAMIC RANGE
HAVING A WIDE AMBIENT TEMPERATURE RANGE
Filed Jan. 21, 1966 5 Sheets-Sheet 1

INVENTOR.
Fred H. Sawada
BY
[signature]
ATTORNEY.

INVENTOR.
Fred H. Sawada
BY
[signature]
ATTORNEY.

INVENTOR.
Fred H. Sawada
BY
Roland A. Anderson
ATTORNEY.

June 13, 1967 F. H. SAWADA 3,325,656

HIGH SPEED DISCRIMINATOR WITH A WIDE DYNAMIC RANGE HAVING A WIDE AMBIENT TEMPERATURE RANGE

Filed Jan. 21, 1966

5 Sheets-Sheet 4

INVENTOR.
Fred H. Sawada

BY

ATTORNEY.

INVENTOR.
Fred H. Sawada
BY
Roland A. Anderson
ATTORNEY.

United States Patent Office 3,325,656

Patented June 13, 1967

3,325,656

HIGH SPEED DISCRIMINATOR WITH A WIDE DYNAMIC RANGE HAVING A WIDE AMBIENT TEMPERATURE RANGE

Fred H. Sawada, Scotia, N.Y., assignor to the United States of America as represented by the United States Atomic Energy Commission

Filed Jan. 21, 1966, Ser. No. 522,326

7 Claims. (Cl. 307—88.5)

ABSTRACT OF THE DISCLOSURE

A pulse discriminator circuit having an output pulse with the same shape and amplitude regardless of the input shape and amplitude. The input pulses are fed via a differentiating network into a first amplifier, through an automatic voltage stabilized back-biased coarse discriminator, into a second amplifier, then into a current stabilized tunnel diode fine discriminator and subsequently into a third amplifier stage.

The invention described herein was made in the course of, or under, a contract withe the U.S. Atomic Energy Commission.

This invention relates to electronic pulse circuitry subjected to a wide ambient temperature range, and more particularly to an amplitude sensitive pulse discriminator with a wide dynamic range for eliminating short duration random high frequency input pulses having an amplitude below a pre-set minimum.

Many different pulse height discriminator circuts have been developed for various purposes for radiation detection and for other electronic systems. In the field of nuclear physics, the requirements for rapidity at which the detection and counting of nuclear particles is constantly increasing. Since many forms of counters require pulse discriminators to select desired counts from an input signal having an amplitude that may vary over a wide range from extraneous signals, a circuit is needed which is capable of handling very rapidly occurring sequential pulses having a very narrow width with a minimum delay time within the discriminator. A circuit further is needed having a digital type of output pulse having the same shape and amplitude regardless of the input pulse shape and amplitude, for this relaxes the dynamic range requirements of the subsequent electronic circuitry.

In many scientific instruments, weak positive or negative ion currents must be detected and measured. For example, multistage mass spectrometers may be used to detect and measure ion currents produced by rare isotopes wherein the ion currents typically are $10^{-13}$ amperes for the larger and $10^{-19}$ amperes or less for the smaller of two isotopes. Secondary emission electron multipliers have been used for the detection of single particles such as ions because an electron multiplier possesses high gain and good signal to noise ratio. In operation an electron multiplier converts an ion beam into a highly amplified current of electron pulses which can be measured either as a DC current or by pulse counting. Accordingly, it is essential that the dynamic range of the electron multiplier and pulse counting system be $10^8$:1 or greater. A multi-stage electron multiplier which meets this requirement is disclosed in S.N. 441,392 filed Mar. 19, 1965. The present invention with its high dynamic range of 20,000:1 is particularly suitable for use in conjunction with the above described electron multiplier. Known discriminator circuitry with a dynamic range of 100:1 have been found to be unsatisfactory in certain applications.

It is known to employ in electronic pulse circuitry the unique operating characteristics of tunnel diodes and back biased diodes as high speed discriminators to eliminat input pulses having an amplitude below a pre-set mini mum. However, the pre-set operating point is subject t change due to changes in the ambient temperature of th device. To prevent triggering of the discriminator whic has its operating characteristics altered due to changes i the ambient temperature by spurious noise pulses, th quiescent operating points of the non-compensated de vices must be shifted which results in higher countin losses and increases in switching times.

Accordingly, it is an object of the present invention t provide a circuit for maintaining precise control of th threshold of a high speed discriminator with a wide dy namic range under varying ambient temperature cond tions.

It is another object to provide a discriminator havin dynamic range of 20,000:1 with an input sensitivity of . mv. to 10 volts.

It is another object to provide a circuit for stabilizin the bias point of a tunnel diode when the peak current decreased from a pre-set operating point as a result of large change in the ambient temperature to prevent tri gering of the tunnel diode by spurious noise pulses so a to prevent counting losses.

It is another object to provide a circuit to provide fo the precise control of a back biased diode discriminato to compensate for the large shift in the forward voltag of the diode as a result of changes in the ambient temper ture of the diode so as to prevent counting losses.

It is another object to provide a tunnel diode circu which has a fast switching time even when subjected t large ambient temperature changes in that the diode ca switch more rapidly into the high voltage, low curre region due to the higher bias setting of the pre-set opera ing point.

It is another object to provide for the precise setting o the operating point of a tunnel diode automatically in a cordance with changes in diodes operating characteristi due to temperature changes, whereas the convention method of bias setting by a voltage dividing netwo changes the output pulse width of the tunnel diode f each bias setting.

It is another object to provide a dsicriminator havi an output pulse with the same shape and amplitude r gardless of the input pulse shape and amplitude.

It is another object to provide a temperature sensiti circuit for a tunnel diode so that the tunnel diode's q escent operating point maintains a more nearly consta relation to the peak current over a wide range of opera ing temperatures.

The present invention is a discriminator which eli inates input pulses below a preselected amplitude a provides uniform output pulses for input pulses having range of values between .5 millivolts and 10 volts amplitude. The input pulses as for example from an ele tron multiplier are fed via a differentiating network in a common emitter transistor amplifier operating ne saturation. The amplified positive output pulse of t amplifier is next fed to an automatic voltage stabiliz back biased diode coarse discriminator. The positive ou put of the coarse discriminator is further amplified befo being fed into an automatic current stabilized tunnel dio fine discriminator. The positive output of the fine di criminator is further amplified to provide a constant a plitude pulse to a counter or recorder for all input puls that exceed a preselected amplitude.

The invention will be clearly understood by referen to the accompanying 9 sheets of drawings wherein.

Figure 1:
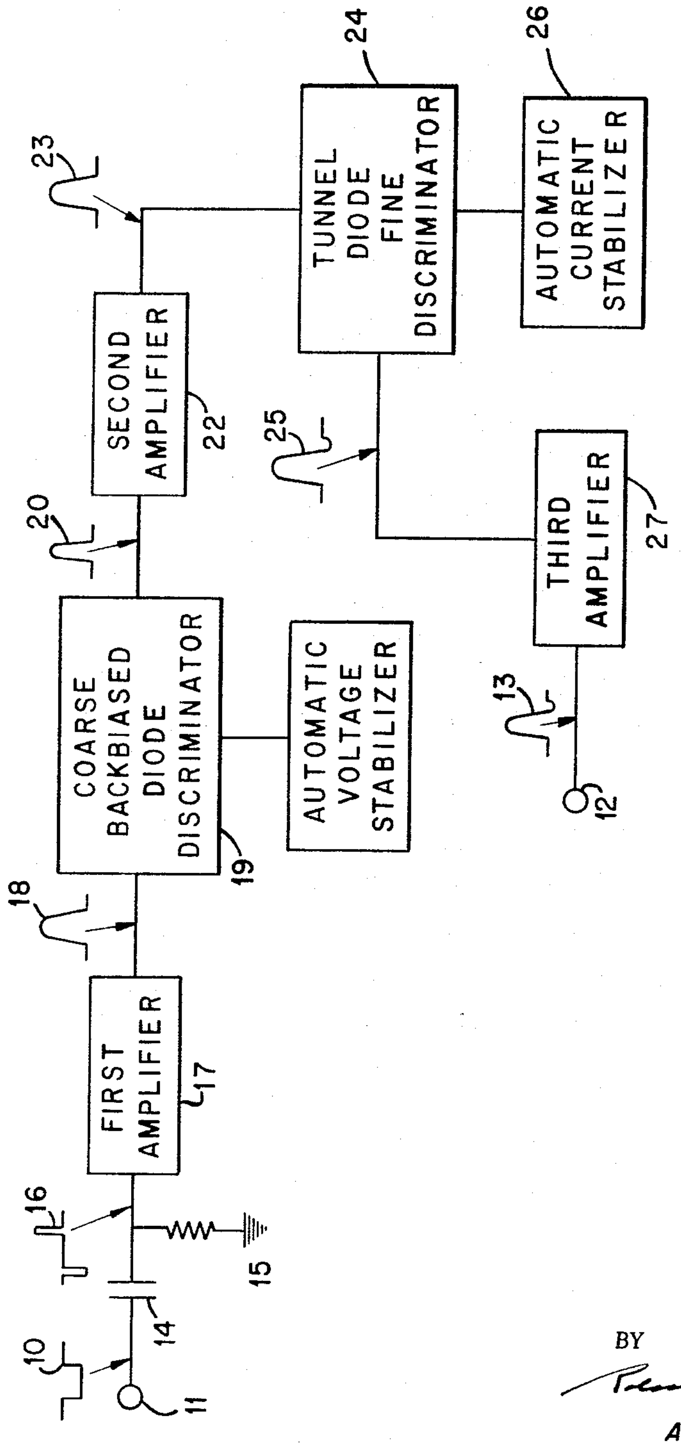
FIGURE 1 is a block diagram of a high speed di criminator circuit with a wide dynamic range having 'ide ambient temperature range in accordance with the resent invention.

Referring now to FIGURE 1, there is illustrated in lock diagram an embodiment of a high speed discrimi-ator circuit with a wide dynamic range having a wide mbient temperature range. High frequency input pulses 0 having an amplitude varying from .5 millivolt to 10 olts with a frequency as high as 100 megacycle are pplied to input terminal 11 for providing an output :rminal 12 a digital type of output pulse 13 having the ıme shape and amplitude regardless of the input pulse ıape and amplitude. Input pulses 10 are passed through differentiating network comprised of capacitor 14 and :sistor 15 which differentiates input pulse 10 to pro-ide a negative and positive pulse as represented by ref-:ence figure 16 corresponding to the leading and 'ailing edge of the input pulse to a first amplifier 17 'hich results in positive output pulse 18. Output pulse 8 is applied to the input of a back biased PN junction iode coarse discriminator circuit 19 which eliminates ıput pulses below a certain pre-set level and passes ulses above this level as designated by reference gure 20.

To prevent shifting of the pre-set bias point of the back ias diode circuit as a result of changes in the forward oltage of the diode caused by changes in the ambient :mperature, the pre-set bias level of the back biased iode discriminator is controlled by the automatic voltage abilizing circuit 21.

The output 20 of the automatically stabilized dis-:riminator 19 is connected to a second amplifier 22 so ıat amplified output pulse 23 is applied to a tunnel iode circuit 24 which eliminates input pulses below a :rtain pre-set level and passes above this level an utput pulse 25 having the same shape and amplitude, :gardless of the input pulse 10 shape or amplitude.

An inherent characteristic of the tunnel diode is that ıe peak current decreases with rises in the ambient :mperature. This change is generally toward the nega-ve direction from 25° C. ambient. Therefore, to offset ıis shift of peak current an automatic current stabilizer 6 is connected to the tunnel diode discriminator :rcuit 24.

The output pulse 25 of tunnel diode discriminator :rcuit 24 is further amplified by means of the third mplifier 27 to provide an output pulse 13 at output :rminal 12.

Figure 2:
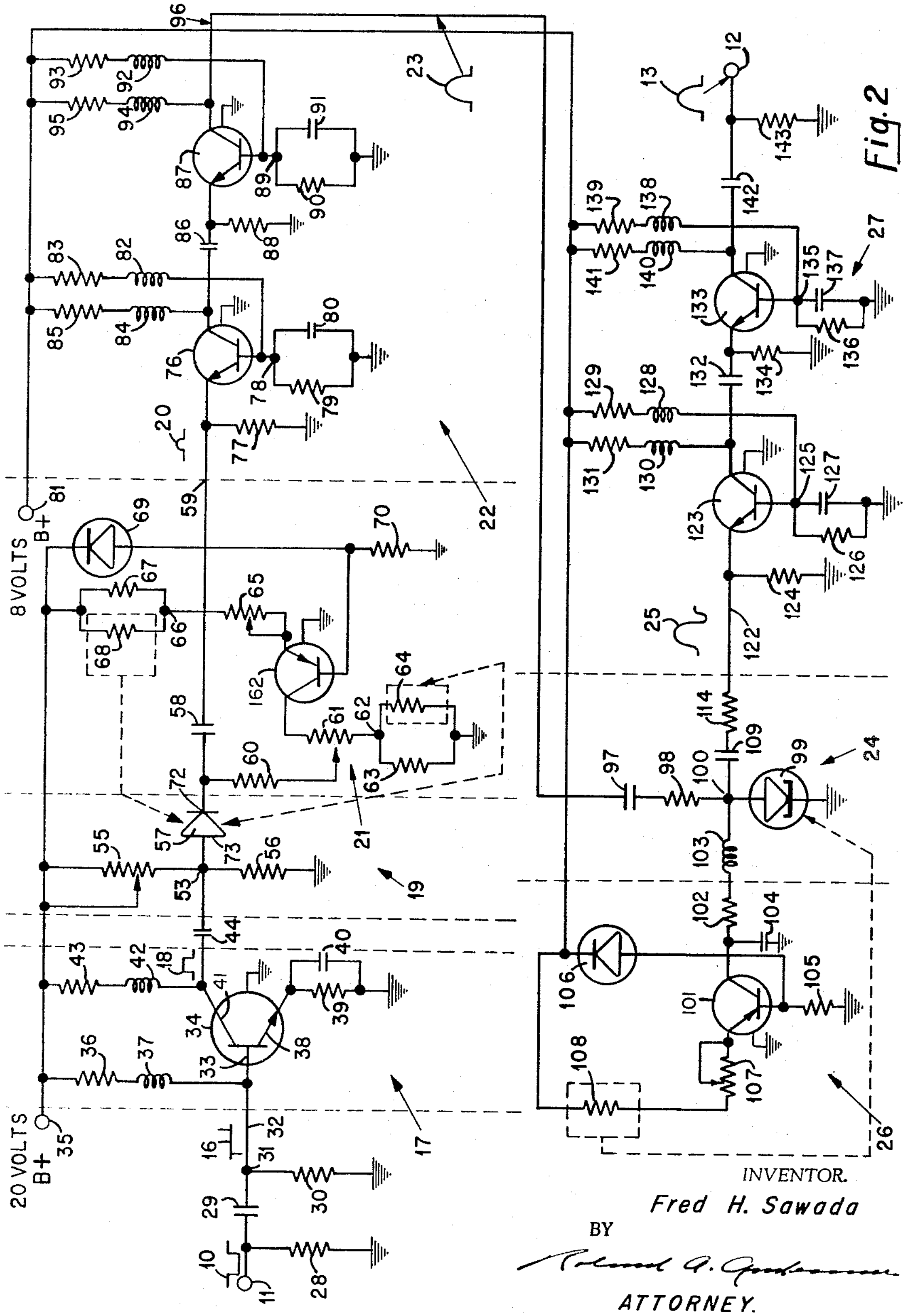
FIGURE 2 is a detailed schematic diagram of the cir-uitry of the present invention as set forth in the block iagram of FIGURE 1.

Referring now to FIGURE 2, there is illustrated a de-ıiled schematic diagram of the present invention as set ırth in the block diagram of FIGURE 1 of the high ɔeed discriminator with a wide dynamic range having a ide ambient temperature range.

Negative pulse 10 is applied to input terminal 11 :cross which is shunted input terminating resistor 28 ) ground. Terminal 11 is connected to a differentiating :twork comprised of capacitor 29 and a resistor 30. Resistor 30 is shunted across the capacitor's output 31 and ground so that input pulse 10 is differentiated to provide a negative and a positive pulse corresponding to the leading and trailing edge of the input pulse as may be seen by the waveform represented by reference figure 16. The output of the differentiating network formed by the junction of output 31 of capacitor 29 and resistor 30 is connected to the first amplifier 17 by conductor 32.

*First amplifier*

The output pulse 16 of the differentiating network is applied to the base 33 of transistor 34 of first amplifier 17. Transistor 34 is biased by connecting its base 33 to a positive voltage terminal 35 by serially connected resistor 36 and inductor 37. The emitter 38 of transistor 34 is connected via resistor 39 to ground. Capacitor 40 is shunted across resistor 39 so that the resistor 39 and capacitor 40 prevent degeneration. The collector 41 of transistor 34 is connected to the positive voltage terminal 35 by the series circuit of inductor 42 and resistor 43. A DC blocking capacitor 44 connected to the collector 41 of transistor 34 constitutes the output connection for the first amplifier 17.

In operation input pulse 10 is applied to the differentiating network comprised of capacitor 29 and resistor 30 so that a differentiating pulse with both a negative and positive peak designated by reference figure 16 will be applied to base 33 of NPN transistor 34 of amplifier 17. Transistor 34 is biased near saturation so that only the negative peak will be amplified, inverted in polarity, and passed through capacitor 44 as designated by reference figure 18.

Figure 3:
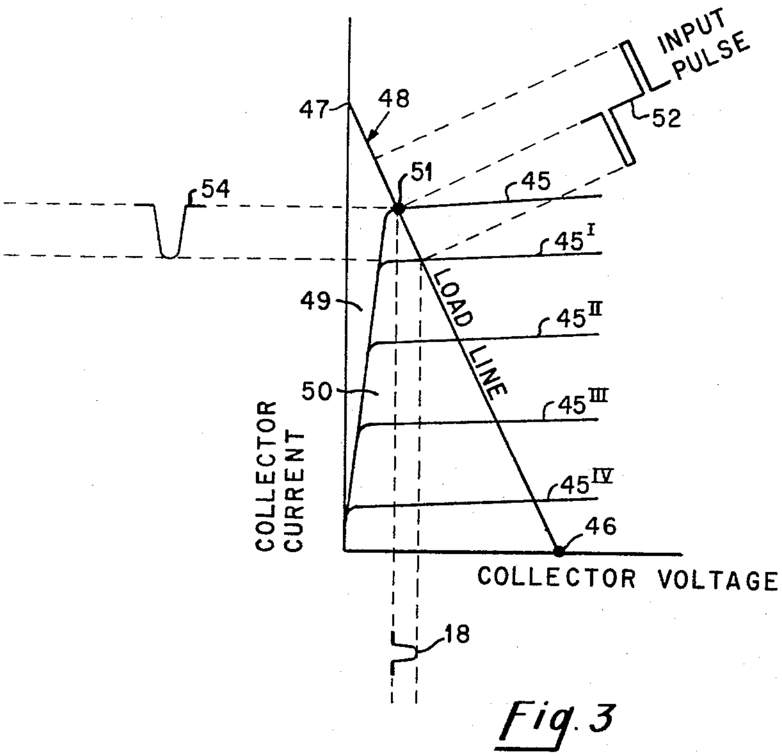
FIGURE 3 is a diagram of the characteristics of a ommon emitter transistor amplifier.

The amplification of the negative input pulses and the clipping of the positive input pulses may be more clearly understood by reference to FIGURE 3 which is a diagram of the characteristics of a common-emitter transsistor amplifier 17.

In FIGURE 3, there is shown the output characteristic curves of a common emitter transistor amplifier 17 with the collector current plotted on the ordinate axis and the collector voltage plotted on the abscissa axis for various values of base current. To establish the load line on the characteristic curves of FIGURE 3, a point respectively on the abscissa and ordinate axis must be located. When the collector current is zero the total collector supply voltage equals the collector voltage and is designated as reference point 46 on the abscissa of the plot in FIGURE 3. When the voltage on the collector is zero, then the total collector supply voltage is dropped across the load resistor 43 for amplifier 17 and the collector current may be determined and designated as point 47 on the ordinate of the plot in FIGURE 3. Connecting points 46 and 47 with a straight line establishes the load line 48. From the characteristic curves with load line of FIGURE 3, distinct operating regions may be observed for a common emitter amplifier. Reference figure 49 designates the saturation region. In this region the emitter and collector are biased in the forward direction and the input impedance at this operating point will be very low. This is also the high current region. Reference figure 50 designates the normal operating region for a transistor, and in this region the emitter is forward biased and the collector is reversed biased. By operating transistor 34 near saturation at quiescent point 51 on load line 48, only the negative input peak will be amplified and the positive input peak clipped because only the negative portion of input pulse 52 results in an output across the load as output voltage pulse 18 and output current pulse 54. By further operating amplifier 17 near saturation, the maximum swing on the load line may be obtained for large negative input signals with a minimum of distortion.

One of the problems with transistorized circuitry is the inherent capacitive reactance of transistors at high frequencies. This reactance varies with frequency and may result in network instability or oscillation which is due to the internal feedback through the collector to base capacitance. In addition this reactance causes a change in the input and output impedance levels which may decrease as much as two to one at frequencies greater than 100 megacycles thus destroying linearity and amplifying ability of the network. Accordingly, the object of inserting inductors 37 and 42 in the base and collector circuits of amplifier 17 is to partially neutralize the input and output capacitance of transistor 34 and to assure an adequate impedance level to maintain an adequate amplifier output signal level.

*Back biased diode coarse discriminator and automatic voltage stabilizer*

The output pulse 18 from the first amplifier 17 is fed through blocking capacitor 44 to the back biased diode coarse discriminator 19 by impressing pulse 18 on the junction 53 formed by resistors 55 and 56. Potentiometer 55, disposed between junction 53 and voltage source 35, and resistor 56 disposed between junction 53 and ground constitutes the variable voltage divider, biasing network for back biased diode 57. The side of diode 57 opposite junction 53 is connected to blocking capacitor 58 having an electrical conductor 59 which constitutes the output for coarse discriminator 19.

Automatic voltage stabilizer 21 is comprised of a resistor 60 connected from the junction between back biased diode 57 and capacitor 58 to a tap on variable resistor 61. One end of variable resistor 61 is connected to the collector of transistor 162. The end of variable resistor not connected to transistor 162 is connected to junction 62 formed by resistor 63 and sensitor 64 which is thermally coupled to diode 57. The ends of resistors 63 and 64 not connected to junction 62 are grounded. The emitter of transistor 162 is connected to one end of potentiometer 65. The other end of potentiometer 65 not connected to transistor 162 is connected to the junction 66 formed by resistor 67 and sensitor 68 which is thermally coupled to diode 57. The ends of resistor 67 and sensitor 68 not connected to junction 66 are connected to voltage source 35. A reversed-biased or zener diode 69 is connected across source 35 and the base of transistor 162 for voltage stabilization purposes. Resistor 70 is connected to ground from the base of transistor 162 to complete the automatic voltage stabilizer 21.

Figure 4:
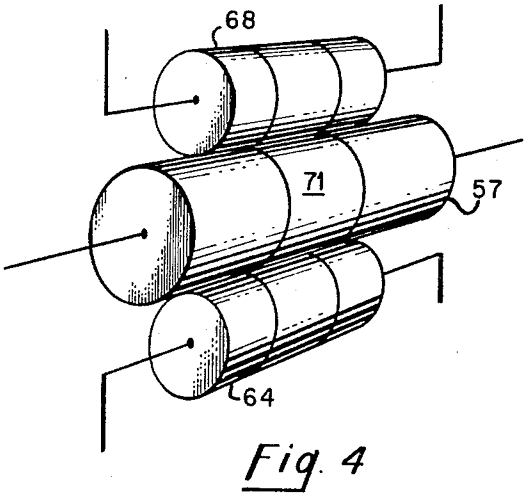
FIGURE 4 is a perspective side view of a back biased ınction diode with sensitors attached thereto.

The thermal coupling of sensitors 64 and 68 to back biased diode 57 may be more clearly understood by referring to FIGURE 4. To maintain a more precise thermal coupling so as to detect the rise in temperature of back biased PN junction diode 57, sensitors 64 and 68 are attached thereto by wrapping "Mylar," a polyester film, tape 71 around the sensitors and the diode.

In the operation of back biased diode coarse discriminator 19, a pulse 18 is applied to PN junction diode 57. A semiconductor diode, such as diode 57 is made of two materials, a donor which is an "N" material with electrons as the majority carrier as designated by reference figure 72 in FIGURE 2, and a "P" material with "holes" as the majority carrier as designated in reference figure 73 in FIGURE 2. Within a single crystal the two materials will cause the formation of a PN junction. When a PN junction is formed a small current will flow as the result of "holes" crossing the junction and electrons moving in the opposite direction. Because of electrical equilibrium requirements, this migration will finally cease and there will exist within the junction region a barrier. The "P" side becomes electrically more negative while the "N" side becomes more positive. This potential difference or internal potential barrier which exists at the junction or interface now opposes any movement of carriers. The carriers both "holes" and electrons are influenced by this potential barrier and both carriers tend to shy away from this area. Therefore, in the vicinity of this junction there is a depletion of both majority carriers, i.e. electrons and holes. Thus the region is ‹ fined as the depletion region, and an electric field exists this region. In the region there still exists a few dor and acceptor atoms carrying a negative or positi charge. These atoms are bound in the lattice structure the crystal and are influenced by the electric field tl exists in this region. If a small forward potential is ε plied at the "P" side of the PN junction so as to low or nullify this potential barrier, a flow of current w occur as a result of lowering of the potential barri If, however, a small negative voltage is applied at t "P" side of the junction, instead of a positive potenti the potential barrier of the PN junction is increased the addition of the negative bias resulting in an : creased resistance across the PN junction.

By adjusting the reverse bias on the "P" side 73 PN junction diode 57 with respect to "N" side 72 means of the voltage dividing network comprised variable resistor 55 and resistor 56, the threshold of ba biased coarse discriminator 19 is established. Thus, if incoming pulse such as designated by reference figure is of insufficient value to lower the potential barrier the back biased diode or the pulse will not pass throu the diode discriminator. If the input signal is of sufficie value to overcome the internal potential, the diode is effect forward biased and current flow will result.

Figure 5:
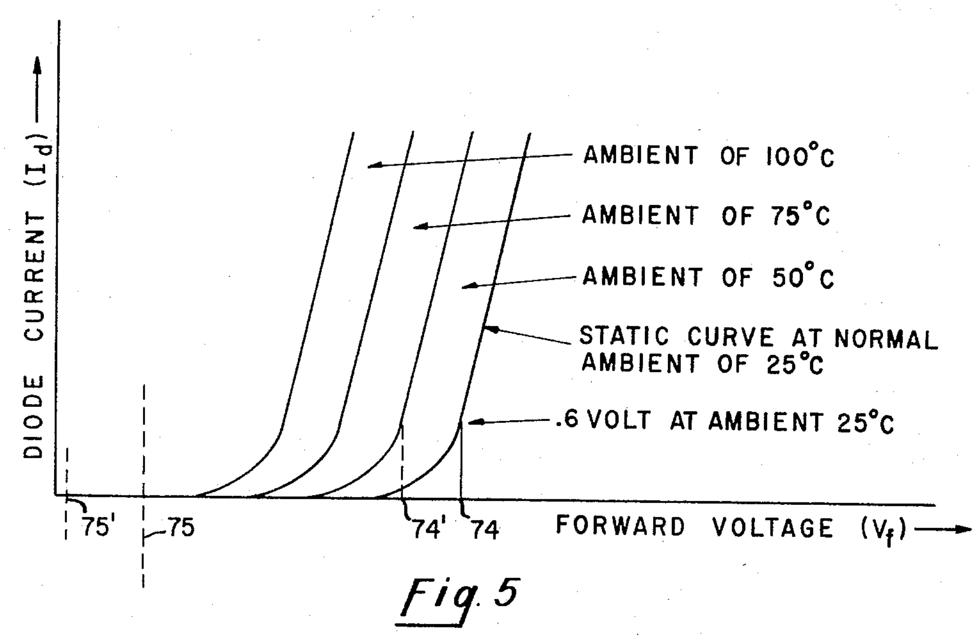
FIGURE 5 illustrates the characteristic curve of a iode.

This may be seen by referring to the static charact istic curve of FIGURE 5 for a typical silicon PN jui tion diode at an ambient temperature of 25° C. havi the diode current plotted on the ordinate axis and t diode's forward voltage plotted on the abscissa ax Reference figure 74 designates the threshold voltage po for a PN junction diode or the point at which the diode a conducting or "on" state. Accordingly, any input s nal greater in amplitude than the threshold voltage po as represented by figure 74 will pass through the dio and any signal less than will not pass through. By ba biasing the diode or applying a negative voltage to t "P" side with respect to the "N" side of the diode or certain input signals will have sufficient amplitude exceed the threshold 74 so as to pass through the dio‹

However, a problem arises in that point 74 is te: perature sensitive. An inherent characteristic of PN dioc is that the forward voltage decreases with rises in t ambient temperature. Typically this change is about mv./° C. Therefore, for a 25° C. rise in temperatu the forward voltage of a diode will be decreased by mv. This change in the characteristic curve for a dio for various temperature rises is shown in FIGURE This large shift in the forward voltage effects the pre-: bias level so that close control of the threshold of a ba biased diode discriminator is extremely difficult to ma tain, resulting in an input signal of a lower amplitu than desired to pass through the diode. Assuming tl the voltage dividing network comprised of variable : sistor 55 and resistor 56 were adjusted to set bias po: 75, then any positive voltage greater than the differen between the threshold point 74 and the bias point would pass through the diode. However, if the diod temperature increases to 50° C., the threshold is shift to 74'. Therefore, any input signals greater than the diffe ence between threshold 74' and bias point 75 would pa through the diode. In that the difference between 74 a 75 is greater than the difference between 74' and 75, t diode discriminator becomes temperature sensitive a: passes input pulses of lower amplitude as the temperatu increases. To offset this loss in the forward voltage, additional reverse bias must be supplied at the N jur tion to shift the bias point to 75' so that the differen between 74' and 75' is the same as the difference betwe 74 and 75 so that only signals of a predetermined amp tude will pass through the diode irrespective of chang in the ambient temperature of the diode.

The automatic compensating or nullifying of the diod shift (decreases in this embodiment) in the forward vc e may be understood more clearly by referring to FIGRE 2. The current through resistance 61 is controlled ' potentiometer 65. Since 61 is a variable resistor, the as in the "N" side of the PN junction diode 57 can be ried by either potentiometer 65 which changes the current through resistor 61 or maintaining a constant current ' fixing resistor 65 and changing the resistance of resistor . In the specific embodiment, sensistor 64 has a positive efficient of resistance of 0.7 ohm/° C. At ambient temrature, sensistor 64 has a nominal value of 200 ohms. t a temperature rise of 25° C., the change in sensitor would be 200 ohms+.7 ohm/° C.×25° C., or a total 217.5 ohms. The equivalent resistance of resistors 63 d 64 at ambient temperature is 100 ohms. At a 25° C. e in temperature from 25° C. ambient, this equivalent sistance changes to 104 ohms, at net change of 4 ohms. t a 50° C. rise in temperature, the equivalent resistance 108 ohms. Thus, the total change of the equivalent sistance of the parallel combination of resistors 63 d 64 is 8 ohms. As it was stated above, each degree C. e in the ambient temperature changes the forward voltre of the PN junction diode by 2 mv. Therefore, at ° C. rise from an ambient temperature of 25° C., the ange would be 50 mv.; and at a 50° C. rise from ament this change would be 100 mv. Thus, the total shift loss of forward voltage is 100 mv. for a temperature cursion of 50° C. from an ambient of 25° C. To avoid lse triggering of the back biased diode caused by the ss of forward voltage due to changes in temperature, mpensation is required to offset this loss in the forward ltage. In that the total change of the equivalent restance for the parallel network comprised of resistors and 64 is 8 ohms from an increase in temperature om the ambient of 25° C. to 75° C. and the shift in e forward voltage of diode 57 from ambient to 75° C. is 0 mv., the current through the series parallel network resistors 63 and 64 should be 12.5 ma. to offset the ss in forward voltage (*i=e/r*, or 100 mv./8). By calcuting the voltage across the parallel network of resistors and 64, it is found that the voltage drop across the twork at 25° C. is $e=ir$ or $e=100\ (12.5\times10^{-3})=1.25$ lts; the drop at 50° C. is $e=104\ (12.5\times10^{-3})=1.30$ lts and the drop at 75° C. is $108\ (12.5=10^{-3})=1.35$ lts.

As was pointed out above, at 75° C. the change in the rward voltage for diode 57 is 100 mv. (50° C.×2 mv./ C.). To offset this loss in forward voltage an additional verse bias must be applied at N junction 72 of diode 7 to make up for this loss. By subtracting the voltage op across the parallel combination of resistors 63 d 64 at an ambient of 25° C. which is 1.25 volts from ° C. ambient which is 1.35 volts, it may be seen that volt or 100 mv. is added to "N" junction 72. Therere, the PN junction loss of forward voltage is compented by the additional reverse bias voltage of 100 mv. hen the equivalent resistance of resistors 63 and 64 ineased from 100 to 108 ohms.

The current of 12.5 ma. is set by potentiometer 65 and e threshold bias for diode discriminator 57 is set by sistor 61. The value of resistor 65 may be calculated as llows. If the beta of the transistor is high (transport ctor, see Middlebrook, An Introduction to Junction ransistor Theory, 145 (1957)), then the collector $I_c$ may e approximated by the emitter current $I_e$. Therefore:

$$Ie=I_c\frac{V_z-V_{be}}{R_v+R_t} \qquad (1)$$

here:

$V_z$= zener diode 69 voltage rating which is 6.3 volts for Type 1N827

$V_{be}$=internal potential shift of a PN junction diode due to the rise in ambient temperature which is .6 volt at 25° C. and changes by 2 mv./° C.

$R_v$=resistor 65

$R_t$=resistor 67 times resistor 68 divided by the sum of resistors 67 and 68. $(R_{67}\times R_{68})/R_{67}+R_{68}$ at an ambient temperature of 25° C.:

$$12.5\times10^{-3}=\frac{6.3-.6}{R_v+100} \qquad (1)$$

solving for $R_v$ $$R_v=R_{65}=356 \text{ ohms}$$

It may be seen that at 50° C., $I_c$ remains a constant by substituting in Equation 1 the following:

$$I_c=I_e=\frac{6.3-(.6-(25°\text{ C.}\times2\text{ mv/° C.}))}{356+104}=12.5\times10^{-3} \qquad (1)$$

Accordingly, the precise control of coarse back biased discriminator 19 is maintained in face of varying temperature changes of the circuit itself.

*Second amplifier*

The output pulse as represented by reference figure 20 from the back biased coarse discriminator 19 is applied to the second amplifier 22 via electrical conductor 59 as may be seen in FIGURE 2. Electrical conductor 59 is connected to the emitter of a NPN transistor 76 having a resistor 77 connected from the emitter to ground. The base of transistor 76 is connected to junction 78 formed by grounded resistor 79 and grounded capacitor 80. The base of transistor 76 is connected to positive voltage terminal 81 of 8 volts by the serially connected inductor 82 and resistor 83. The collector of transistor 76 is connected to the positive voltage terminal 81 by the serially connected inductor 84 and resistor 85. A DC blocking capacitor 86 connects the collector of transistor 76 to the emitter of a NPN transistor 87 having a resistor 88 connected from the emitter to ground. The base of transistor 87 is connected to junction 89 formed by grounded resistor 90 and grounded capacitor 91. The base of transistor 87 is connected to the positive voltage terminal 81 by serially connected inductor 92 and resistor 93. The collector of transistor 87 is connected to the positive voltage terminal 81 by serially connected inductor 94 and resistor 95. Electrical conductor 96 connected to the collector of transistor 87 constitutes the output for second amplifier 22.

In operation input pulse 20 derived from the back biased coarse discriminator 19 is applied to the input of second amplifier 22. Second amplifier 22 consists of two NPN transistors 76 and 87 in a common base amplifier configuration. The amplifier input 20 appears at the output 96 of second amplifier 22 as an amplified output pulse 23.

As in the case of the first amplifier 17, inductors are inserted in the circuits of transistors 76 and 87 to partially neutralize the output capacitance of the transistors and to assure an adequate impedance level at the operating frequency so as to maintain an adequate amplifier output signal level.

*Tunnel diode fine discriminator and automatic current stabilizer*

The positive output pulse 23 at the collector of transistor 87 is coupled by means of electrical conductor 96, capacitor 97, and resistor 98 to tunnel diode 99 at junction 100. The collector of PNP transistor 101 is connected to junction 100 by serially connected resistor 102 and inductor 103. The collector of transistor 101 is bypassed to ground by capacitor 104. The base of transistor 101 is connected to ground by means of resistor 105. A reversed-biased or zener diode 106 is connected across the positive voltage source 81 and the base of transistor 101 for voltage stabilization purposes. A potentiometer 107 is connected between the emitter of transistor 101 and the positive voltage source 81 by means of sensitor 108 which is thermally coupled to tunnel diode 99. A serially connected capacitor 109 and resistor 114 connected to junction 100 constitutes the output for tunnel diode fine discriminator 24.

Figure 6:
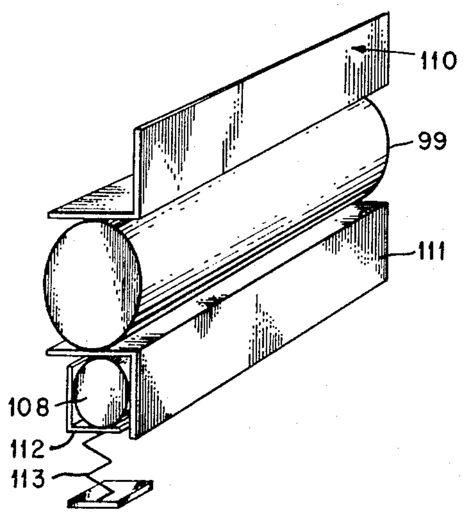
FIGURE 6 is a perspective view of a tunnel diode with sensistor attached thereto.

The thermal coupling of sensitor 108 to tunnel diode 99 having a positive connection 110 and a ground connection 111 may be more clearly understood by referring to FIGURE 6. To maintain a more precise thermal coupling, sensitor 108 held by mounting 112 is spring loaded by means of spring 113 to forcibly engaging sensitor 108 and ground connection 111 of diode 99 so as to detect the rise in temperature of tunnel diode 99.

In the operation of the tunnel diode fine discriminator 24, the positive pulse 23 from the collector of transistor 87 fires the tunnel diode 99 to provide an output pulse 25 through capacitor 109 and resistor 114

Figure 7:
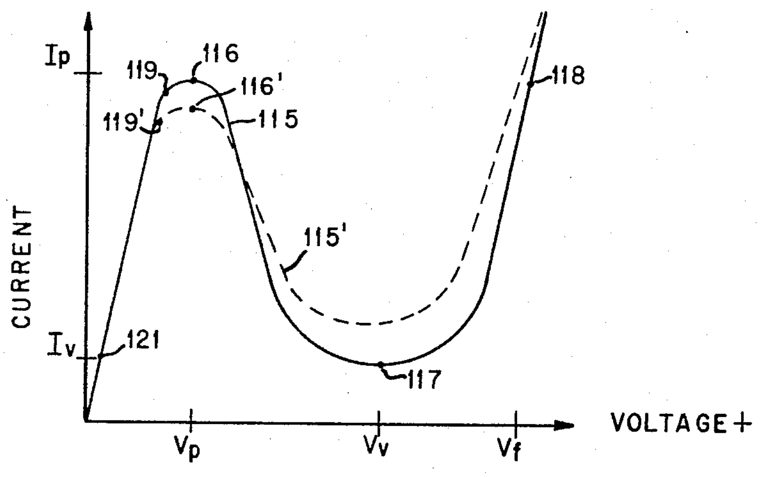
FIGURE 7 is a diagram of the characteristics of a tun-el diode, shown to assist in an understanding of the ıvention.
Figure 8:
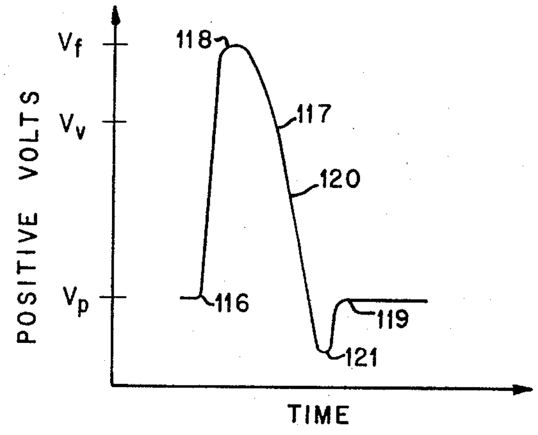
FIGURE 8 is a diagram of the output pulse of a tunnel iode, shown to assist in an understanding of the invention.

Reference is made to FIGURE 7 wherein there is shown a plot of the current flowing through the tunnel diode 99 versus the voltage thereacross, and to FIGURE 8 which shows the output pulse of the tunnel diode. The tunnel diode's characteristics are represented by the curve 115. As the voltage increases to some value $V_p$, the current through the tunnel diode will increase to a peak value $I_p$. The point on the characteristic curve 115 at which these values occur is designated by reference number 116. As the voltage increases beyond the value $V_p$, the current through the tunnel diode decreases indicating that the tunnel diode has a negative characteristic. The decrease in current continues with increases in voltage until the voltage reaches the value $V_v$. The point on the characteristic curve 115 at which the lowest value of current flows at voltage $V_v$ is designated by reference number 117. Thereafter, the current through the tunnel diode will increase with increasing voltage to a high voltage $V_f$ which is represented on the characteristic curve 115 by reference number 118. Between the two points 116 and 117 on characteristic curve 115, there is a region in which the tunnel diode exhibits a negative resistance characteristic. This is not a stable region, and a tunnel diode will try to go either to a potential lower than $V_p$ or higher than $V_v$, both of which would be stable states.

Tunnel diode 99 is biased in the forward direction by potentiometer 107 to locate the quiescent operating point 119 on the positive slope of the low voltage-high current region of characteristic curve 115. The peak of the positive pulse 23 from second amplifier 22 will switch the tunnel diode to the high voltage state 118 as may be seen in FIGURE 7 to produce the leading edge of output pulse 120 as may be seen in FIGURE 8. The current in inductor 103 will decrease exponentially from its value at 118 until it reaches the valley current $I_v$ at which time the tunnel diode will switch back to its low voltage state. The switching time from point 116 to 118 on curve 115 of FIGURE 7 is the rise time which is also seen for output pulse 120 in FIGURE 8. The time interval between points 118 and 117 is the pulse duration. The time interval between points 117 and point 121 is the fall time of the otuput pulse. Point 121 relates to the point on curve 115 corresponding to low voltage value for $I_v$ on the low voltage portion of curve 115. The recovery time of the output pulse is that interval of time between 121 and the quiescent operating point 119 as shown in FIGURES 7 and 8. Accordingly, the total time of the output pulse is less than ten nanoseconds.

Figure 9:
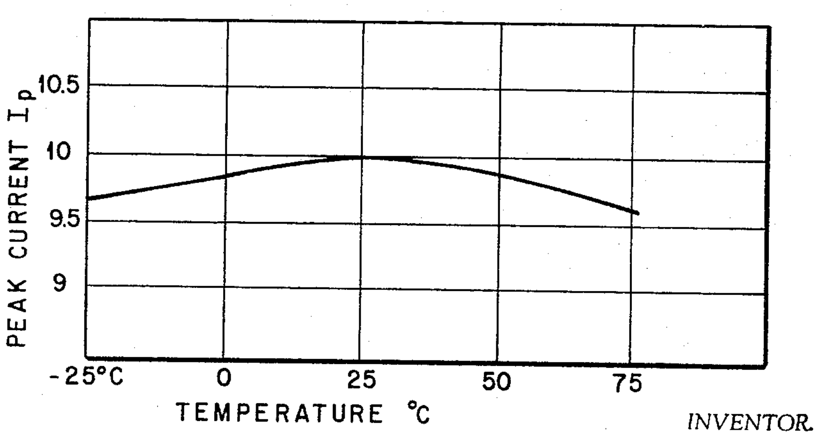
FIGURE 9 is a diagram of the peak current of a tunnel iode with respect to changes in the ambient tempera-ıre, shown to assist in an understanding of the invention.

An inherent characteristic of the tunnel diode is that the peak current 116 decreases with rises in the ambient temperature and is generally toward the negative direction from 25° C. ambient as may be seen in FIGURE 9. The lowering of the peak current may be noted by observing in FIGURE 7 the characteristic curve 115' for tunnel diode 99 at 50° C. which is represented by dashed lines relative to characteristic curve 115 at 25° C. The original quiescent bias point 119 now exceeds the threshold 116' for characteristic curve 115'. This excess bias will force the tunnel diode to switch to the high voltage region without the application of an input signal.

An automatic temperature compensating current sour designated by reference figure 26 is used to offset th change in the peak current and is shown schematically i FIGURE 2. Source 81 controls the emitter current transistor 101 by the voltage $V_1$ which is applied acro the series resistance 108 and 107. If the beta of transist 101 is high, then $I_c$ (collector current) may be approx mated as $I_e$ (emitter current). The emitter current is d termined by the applied voltage across resistors 107 an 108. Therefore:

$$I_e = I_c = I_{td} = \frac{V_z - V_{eb}}{R_s + R_v} \qquad (2$$

Where:

$I_e$=emitter current
$I_c$=collector current
$I_{td}$=tunnel diode current
$V_{eb}$=base to emitter voltage (0.6 volt for silicon tra sistor at an ambient temperature of 25° C., this volta decreases linearly 2 mv./° C.
$V_z$=zener voltage (5.6 volts in this embodiment)
$V_1$=applied voltage
$R_s$=sensitor 108 (500 ohms with a positive coefficient resistance of 0.7 ohm/° C.)
$R_v$=resistor 107 (potentiometer with a resistance of 0 5 ohms)

Letting:

$V_z$=5.6 volts
$V_{eb}$=0.6 volt
$R_s$=500 at ambient temperature of 25° C.
$R_v$=0 ohm (shorted out)

Substituting the above in Equation 2, the tunnel dio bias is:

$$I_{td} = \frac{V_z - V_{eb}}{R_s + R_v} = \frac{5.6 - .6}{500} = 10 \text{ ma.} \qquad ($$

From the analysis of the curve of FIGURE 9, which a diagram of the peak current of a tunnel diode with r spect to changes in the ambient temperature, the pea current through the tunnel diode at 25° C. ambient is 1 ma. as compared to the peak tunnel diode current shi to 9.8 ma. at 50° C. as represented by reference poi 116' in FIGURE 7. Thus, the shift in peak current is ma. or 2%. If the operating point 119 is set at 9.9 m by resistor 107, the tunnel diode will switch to the hig voltage-low current region without the application of a input signals of the peak current shifts from 10 ma. 9.8 as a result of a change in the tunnel diode's tempe ature from 25° C. to 50° C.

In the specific embodiment of the automatic curre stabilizer 26 will lower the quiescent operating point 119' to prevent the tunnel diode from switching to t high voltage-low current region without the applicati of an input signal as the tunnel diode's temperatu changes from 25° C. to 50° C. In the specific embod ment the peak bias current is 10 ma. for a type 1N38 tunnel diode. Since sensitor 108 has a positive coefficie of 0.7 ohm per degree C., then a 25° C. rise from the an bient temperature of 25° C. will result in a change in of 500 ohms +0.7 ohm/° C.×25° C. or $R_s$=517. ohms.

At a change in temperature of 25° C. from ambient t change in bias current from the automatic current stab lizer 26 can be determined from Equation 2. Where:

$V_z$=5.6 volts
$V_{eb}$=0.6 volt
$R_s$=0

ıccordingly:

$$I_{td}=\frac{5.6-.6}{517.5}$$

$$I_{td}=9.67 \text{ ma.} \quad (2'')$$

If the base to emitter voltage shift for a silicon tranistor is considered then the change in bias current from urrent stabilizer 26 would be:

$$I_{td}=\frac{5.6-(0.6-2°\text{C.}\times 0.002 \text{ volt/°C.})}{517.5}$$

$$I_{td}=9.75 \text{ ma.} \quad (2''')$$

Thus, by comparing the results of the Equation 2′ for ıe current through the tunnel diode at 25° C. which is 0 ma. to the current through the tunnel diode at 50° C. 'hich is 9.75 ma. (see 2‴), the bias current change by utomatic current stabilizer circuit shifts the tunnel diode 9 peak current 2.5% for a 25° C. rise from the ambient ›mperature. The temperature compensating network 108 ı current stabilizer 26 will lower the quiescent point 119′ › 9.75 ma. as may be seen in FIGURE 7. This new thresold point will still maintain nearly the same degree of ıput sensitivity at 50° C. as was the case at 25° C. Thus, 'ith the automatic current stabilizer 26, stability of an perating point with respect to the characteristic curve ›r a tunnel diode is maintained at wide ranges of operting temperatures so that the quiescent operating point ıaintains a more nearly constant relationship to the peak urrent.

*Third amplifier*

The output pulse, as represented by reference figre 25, from the tunnel diode fine discriminator 24 ; applied to the third amplifier 27 via electrical conduc›r 122. As may be seen in FIGURE 2, electrical conuctor 122 is connected to the emitter of a NPN transis›r 123 having a resistor 124 connected from the emitter › ground. The base of transistor 123 is connected to ınction 125 formed by grounded resistor 126 and rounded capacitor 127. The base of transistor 123 is onnected to positive voltage terminal 81 by the serially onnected choke 128 and resistor 129. The collector of :ansistor 123 is connected to the positive voltage terminal 1 by the serially connected choke 130 and resistor 131. ı DC blocking capacitor 132 connects the collector of :ansistor 123 to the emitter of a NPN transistor 133 aving a resistor 134 connected from the emitter to round. The base of transistor 133 is connected to juncon 135 formed by grounded resistor 136 and grounded apacitor 137. The base of transistor 133 is connected to ositive voltage source 81 by serially connected choke 138 nd resistor 139. The collector of transistor 133 is conected to the positive voltage terminal 81 by serially conected choke 140 and resistor 141. The collector of tran:stor 133 is connected to the output terminal 12 of the iscriminator-amplifier by a DC blocking capacitor 142. ı terminating resistor 143 is connected from the output ›rminal 12 to ground for matching purposes.

As in the case of the first amplifier 17, the inductors are ıserted in the circuits for transistors 123 and 124 of artially neutralize the output capacitance of the transis›rs and to assure an adequate impedance level at the perating frequency so as to maintain an adequate amplier output signal at terminal 12.

In operation, input pulse 25 derived from the tunnel iode fine discriminator 24 is applied to the input of third mplifier 27 consisting of two NPN transistors 123 and 33 in a common base amplifier configuration. The input ulse 25 to the third amplifier appears at the output terıinal 12 as amplified output pulse 13.

In one embodiment of the invention the following circuit parameters were employed. The values are given for urposes of clearly setting forth the invention and are not ıtended to be construed as limiting the invention.

Resistor 28—51 ohms
Capacitor 29—50 picofarads
Resistor 30—1.2K
Transistor 34—Type 2N2865
Resistor 36—2.7K
Inductor 37—0.3 microhenry
Resistor 39—68 ohms
Capacitor 40—600 picofarads
Inductor 42—0.3 microhenry
Resistor 43—300 ohms
Capacitor 44—1 microfarad
Resistor 55—100K ohms
Resistor 56—4.7K ohms
Diode 57—Type 700D
Capacitor 58—1 microfarad
Resistor 60—5.6K ohms
Resistor 61—1K ohm
Transistor 62—Type 2N1132
Resistor 63—200 ohms
Sensitor 64—200 ohms
Resistor 65—10K ohms
Resistor 67—200 ohms
Sensitor 68—200 ohms
Zener Diode 69—Type 1N827
Resistor 70—1.8K ohms
Transistor 76—2N2865
Resistor 77—75 ohms
Resistor 79—82 ohms
Capacitor 80—500 picofarads
Inductor 82—0.3 microhenry
Resistor 83—300 ohms
Inductor 84—0.3 microhenry
Resistor 85—270 ohms
Capacitor 86—.01 microfarad
Transistor 87—Type 2N2865
Resistor 88—75 ohms
Resistor 90—82 ohms
Capacitor 91—500 picofarads
Inductor 92—0.3 microhenry
Resistor 93—300 ohms
Inductor 94—0.3 microhenry
Resistor 95—270 ohms
Capacitor 97—25 picofarads
Resistor 98—22 ohms
Tunnel Diode 99—Type 1N3858
Transistor 101—Type 2N1132
Resistor 102—20 ohms
Inductor 103—0.15 microhenry
Capacitor 104—0.1 microfarad
Resistor 105—180 ohms
Zener Diode 106—Type 1N827
Resistor 107—5K ohms
Sensitor 108—500 ohms
Capacitor 109—.01 microfarad
Resistor 114—68 ohms
Transistor 123—Type 2N2865
Resistor 124—75 ohms
Resistor 126—82 ohms
Capacitor 127—500 picofarads
Inductor 128—0.3 microhenry
Resistor 129—300 ohms
Inductor 130—0.3 microhenry
Resistor 131—220 ohms
Capacitor 132—.01 microfarad
Transistor 133—2N2865
Resistor 134—75 ohms
Resistor 136—82 ohms
Capacitor 137—500 picofarads
Inductor 138—0.3 microhenry
Resistor 139—300 ohms
Inductor 140—0.3 microhenry
Resistor 141—220 ohms
Capacitor 142—.01 microfarad
Resistor 143—51 ohms It will be understood that various changes in the details, steps and arrangement of parts which have been described and illustrated in order to explain the nature of the invention may be made by those skilled in the art within the principle and scope of the invention as expressed in the appended claims.

I claim:

1. A high frequency pulse amplifier discriminator for providing a constant amplitude output pulse for all input pulses within a desired wide range, comprising:

an electrical source;

an input circuit for receiving said input pulses;

differentiating circuit means having an input and an output, for differentiating said input pulse to provide a negative and positive pulse, said input being connected to said input circuit;

a first transistor amplifier having an input and an output, said input connected to the output of said differentiating circuit means, said amplifier biased near saturation for amplifying said negative pulse and clipping said positive pulse;

a diode discriminator having an input, and an output said input connected to the output of said first amplifier;

means for back biasing said diode discriminator at a predetermined threshold whereby pulses are provided in response to input pulses from said first amplifier which exceed a predetermined value;

automatic voltage stabilizer means thermally coupled to said diode for controlling the threshold of said diode during the shift of the diode's forward voltage caused by changes in temperature of said diode;

a second amplifier having an input and output, the input being connected to said output of said diode discriminator;

a tunnel diode discriminator connected to the output of said second amplifier;

means for biasing said tunnel diode at a predetermined threshold whereby pulses are provided in response to input pulses from said second amplifier which exceed a predetermined value;

automatic current stabilizing means thermally coupled to said tunnel diode for controlling the threshold of said tunnel diode during the shift of the diode's peak current caused by changes in temperature of said tunnel diode;

a third amplifier having an input and an output terminal, said input connected to the said tunnel diode.

2. A high frequency pulse amplifier discriminator according to claim 1 wherein the second amplifier is a common base transistor configuration.

3. A high frequency pulse amplifier discriminator according to claim 1 wherein the third amplifier is a common base transistor configuration.

4. A high frequency pulse amplifier discriminator according to claim 1 wherein the automatic voltage stabilizer means includes:

a transistor having a collector, emitter and a base;

a sensitor having a first and second terminal, thermally coupled to said diode, said first terminal being grounded;

a first resistor, having a first and second terminal, said first terminal being grounded, said second terminal connected to the second terminal of said sensor so as to define a first junction;

a variable resistor having a tap connection, one end of said variable resistor being connected to the said first junction between said sensitor and first resistor, the other end of said variable resistor being connected to the collector of said transistor;

a second resistor connected between the tap of said variable resistor and said output of said diode;

a zener diode connected between the said source and the base of said transistor;

a third resistor connected between the base of t transistor and ground;

a second sensitor having a first and second termin said first terminal being connected to the said sour a fourth resistor having a first and second termin said first terminal connected to said source, sa second terminal connected to the second terminal said second sensitor so as to define a second junctic a potentiometer connected between the emitter of sa transistor and the said second junction.

5. A high frequency pulse amplifier according to clai 1 wherein the automatic current stabilizing means i cludes:

a transistor having a collector, emitter and a base;

a sensitor having a first and second terminal thermal coupled to said tunnel diode, said first terminal co nected to said voltage source;

a potentiometer connected from said emitter of sa transistor to said second terminal of said sensitor;

a first resistor connected from the base of said tra sistor to ground;

a zener diode connected between said source and tl base of said transistor;

a first capacitor connected from the collector of sa transistor to ground;

a second resistor and an inductor serially connect between the collector of said transistor and said tu nel diode.

6. A pulse discriminator:

an input terminal;

an electrical source;

a potentiometer connected between the source of sa input terminal;

a first resistor connected between the input termin and ground;

a diode having an input and an output, said input co nected to said input terminal;

an output terminal;

a capacitor connected between the output of sai diode and the output terminal;

a transistor, having a collector, emitter and a ba connection;

a sensitor having a first and second terminal, thermal coupled to said diode, said first terminal bei grounded;

a second resistor having a first and second termina said first terminal being grounded, said second te minal connected to the second terminal of sai sensitor so as to define a first junction;

a variable resistor having a tap connection, one end said variable resistor being connected to the fir junction between said sensitor and first resistor, tl other end of said variable resistor being connecte to the collector of said transistor;

a third resistor connected between the tap of sai variable resistor and the output of said diode;

a zener diode connected between the said source an the base of said transistor;

a fourth resistor connected between the base of th transistor and ground;

a second sensitor having a first and second termina said first terminal being connected to the source;

a fifth resistor having a first and second terminal; sai first terminal connected to said source, said secon terminal connected to the second terminal of sai second sensitor so as to define a second junction;

and a potentiometer connected between the emitter c said transistor and said second junction.

7. A pulse discriminator:

an input terminal;

an electrical source;

a tunnel diode having a first and second terminal, sai first terminal connected to the input terminal, sai second terminal being grounded;

a transistor having a collector, emitter and base;

a first resistor and an inductor serially connected between the collector and the input terminal, said inductor being connected to the input terminal;

a capacitor connected between ground and the collector of the transistor;

a second resistor connected from the base of the transistor to ground;

a zener diode connected between the said source and the base of the transistor;

and a sensitor thermally coupled to said tunnel diode, and a potentiometer serially connected between the emitter and the said electrical source, by means of the sensitor.

References Cited

UNITED STATES PATENTS

| | | | |
|---|---|---|---|
| 3,158,822 | 11/1964 | Brechling | 307—88.5 |
| 3,281,656 | 10/1966 | Noble | 307—88.5 |

ARTHUR GAUSS, *Primary Examiner.*

JOHN S. HEYMAN, *Examiner.*